(12) United States Patent
Taori et al.

(10) Patent No.: US 9,860,905 B2
(45) Date of Patent: Jan. 2, 2018

(54) METHOD AND SYSTEM FOR PROVIDING SERVICE IN A WIRELESS COMMUNICATION SYSTEM

(71) Applicant: Samsung Electronics Co. Ltd., Suwon-si, Gyeonggi-do (KR)

(72) Inventors: Rakesh Taori, Suwon-si (KR); Yung-Soo Kim, Seongnam-si (KR); Jung-Soo Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 20 days.

(21) Appl. No.: 13/750,242

(22) Filed: Jan. 25, 2013

(65) Prior Publication Data

US 2013/0195042 A1    Aug. 1, 2013

(30) Foreign Application Priority Data

Jan. 27, 2012  (KR) .................... 10-2012-0008455

(51) Int. Cl.
*H04W 72/08* (2009.01)
*H04W 72/04* (2009.01)
*H04L 1/18* (2006.01)
*H04L 1/00* (2006.01)
*H04L 5/00* (2006.01)

(52) U.S. Cl.
CPC ......... *H04W 72/085* (2013.01); *H04L 1/1867* (2013.01); *H04W 72/042* (2013.01); *H04L 1/0026* (2013.01); *H04L 5/0057* (2013.01); *H04L 5/0094* (2013.01)

(58) Field of Classification Search
None
See application file for complete search history.

(56) References Cited

U.S. PATENT DOCUMENTS

2008/0132262 A1   6/2008 Jung et al.
2009/0111473 A1   4/2009 Tao et al.
(Continued)

FOREIGN PATENT DOCUMENTS

CN    101895921 A    11/2010
CN    102090105 A    6/2011
(Continued)

OTHER PUBLICATIONS

CHTTL; Selection Threshold and Maximum Size of CoMP Cooperating Set; 3GPP TSG-RAN WG1 #58; R1-093572; Aug. 24-28, 2009; Shenzhen, China.
(Continued)

*Primary Examiner* — Charles C Jiang
*Assistant Examiner* — George Atkins, Jr.
(74) *Attorney, Agent, or Firm* — Jefferson IP Law, LLP

(57) ABSTRACT

A method and an apparatus for providing a service in a next-generation wireless communication system are provided. The method includes transmitting, upon recognizing an initial access by a Subscriber Station (SS), resource allocation information indicating resources allocated for channel quality reports by the SS to the SS by a master Base Station (BS) serving the SS, determining at least one slave BS that serves the SS and constitutes a first cloud cell, using the channel quality reports received from the SS, and exchanging data with the SS together with the at least one slave BS.

18 Claims, 7 Drawing Sheets

(56) References Cited

U.S. PATENT DOCUMENTS

| | | | |
|---|---|---|---|
| 2010/0157901 A1* | 6/2010 | Sanderovitz | H04B 7/022 370/328 |
| 2010/0291940 A1* | 11/2010 | Koo | H04B 7/024 455/450 |
| 2011/0034175 A1* | 2/2011 | Fong | H04B 7/024 455/450 |
| 2011/0206106 A1* | 8/2011 | Mallik | H04B 7/024 375/226 |
| 2012/0021738 A1* | 1/2012 | Koo | H04B 7/024 455/422.1 |
| 2012/0044872 A1* | 2/2012 | Aydin | H04B 7/022 370/328 |
| 2012/0082058 A1* | 4/2012 | Gerstenberger | H04W 36/0083 370/252 |
| 2012/0088535 A1* | 4/2012 | Wang | H04B 7/024 455/513 |
| 2012/0094710 A1* | 4/2012 | Jia | H04W 72/044 455/524 |
| 2012/0172076 A1 | 7/2012 | Seki | |
| 2012/0207055 A1* | 8/2012 | Kang | H04B 7/024 370/252 |
| 2012/0238274 A1* | 9/2012 | Kodama | H04W 36/0083 455/437 |
| 2012/0281544 A1* | 11/2012 | Anepu | H04B 7/0632 370/241 |
| 2012/0281556 A1* | 11/2012 | Sayana | H04B 7/024 370/252 |
| 2012/0329460 A1* | 12/2012 | Huang | H04B 7/024 455/436 |
| 2013/0044707 A1* | 2/2013 | Chen | H04W 72/1231 370/329 |
| 2013/0088960 A1* | 4/2013 | Bi | H04L 1/1841 370/235 |
| 2013/0114524 A1* | 5/2013 | Sirotkin | H04L 1/0026 370/329 |
| 2013/0143575 A1* | 6/2013 | Ahluwalia | H04W 36/22 455/438 |
| 2013/0176988 A1* | 7/2013 | Wang | H04W 28/08 370/331 |
| 2013/0201841 A1* | 8/2013 | Zhang | H04L 1/1607 370/252 |
| 2013/0215772 A1* | 8/2013 | Kaur | H04W 36/0072 370/252 |
| 2013/0242920 A1* | 9/2013 | Wang | H04W 72/085 370/329 |
| 2014/0126512 A1* | 5/2014 | Kim | H04L 1/1822 370/329 |
| 2015/0085826 A1 | 3/2015 | Ahluwalia | |

FOREIGN PATENT DOCUMENTS

| | | | |
|---|---|---|---|
| EP | 2306769 A1 | 4/2011 | |
| EP | 2306769 B1 * | 4/2011 | H04W 36/00 |
| EP | 2408245 A1 | 1/2012 | |
| JP | 2010-239303 A | 10/2010 | |
| JP | 2010-239417 A | 10/2010 | |
| JP | 2011-061728 A | 3/2011 | |
| WO | WO2010/102424 * | 9/2010 | H04W 72/04 |
| WO | 2010/124647 A1 | 11/2010 | |
| WO | WO-201012467 A1 * | 11/2010 | H04W 16/24 |
| WO | WO2011/136584 * | 11/2011 | H04L 1/18 |
| WO | 2012-000252 A1 | 1/2012 | |
| WO | WO/2013/016861 * | 2/2013 | H04L 1/16 |

OTHER PUBLICATIONS

I2R; Clustering Methods for Base Station Cooperation in LTE-A; 3GPP TSG RAN WG1 Meeting #66; R1-112456; Aug. 22-26, 2011; Athens, Greece.

* cited by examiner

METHOD AND SYSTEM FOR PROVIDING SERVICE IN A WIRELESS COMMUNICATION SYSTEM

PRIORITY

This application claims the benefit under 35 U.S.C. §119(a) of a Korean patent application filed on Jan. 27, 2012 in the Korean Intellectual Property Office and assigned Serial No. 10-2012-0008455, the entire disclosure of which is incorporated herein by reference.

BACKGROUND OF THE INVENTION

1. Field of the Invention

The present invention relates to a method and system for providing services in a wireless communication system.

2. Description of the Related Art

To support high-capacity data services, next-generation wireless communication systems use high-frequency bands such as, for example, millimeter waves (mmWave). In the case of the systems using such high-frequency bands, Base Stations (BSs) have a small cell radius due to the short communication-enabled distances between Subscriber Stations (SSs) and the BSs. In turn, such a small cell radius causes an increase in the number of BSs installed to secure sufficient coverage for the SSs. When the mobility of the SSs is considered, the reduction in cell radius of BSs and the increase in the number of BSs may lead to an increase in the number of inter-cell handovers of SSs. As such, the overhead of the system may increase due to the increased number of SS handovers.

Therefore, practical measures are required to provide more efficient services to users considering the characteristics of high-frequency bands to be used in the next-generation wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and system for providing services in the next-generation wireless communication system.

In accordance with an aspect of the present invention, a method for providing a service in a next-generation wireless communication system is provided. The method includes transmitting, upon recognizing an initial access by a Subscriber Station (SS), resource allocation information indicating resources allocated for channel quality reports by the SS to the SS by a master Base Station (BS) serving the SS, determining at least one slave BS that serves the SS and constitutes a first cloud cell, using the channel quality reports received from the SS, and exchanging data with the SS together with the at least one slave BS.

In accordance with another aspect of the present invention, a method for providing a service in a next-generation wireless communication system is provided. The method includes transmitting data to a SS, using resources allocated from a master BS serving the SS, and transmitting transmission results for the data to the master BS and at least one slave BS that constitutes a first cloud cell for the SS. The first cloud cell may have member BSs including the master BS and the at least one slave BS.

In accordance with another aspect of the present invention, a master BS for providing a service to a SS in a next-generation wireless communication system is provided. The master BS includes a controller for, upon recognizing an initial access by an SS, controlling a transceiver to transmit resource allocation information indicating resources allocated for channel quality reports by the SS to the SS by the master BS serving the SS, and for determining at least one slave BS that serves the SS and constitutes a first cloud cell, using the channel quality reports received from the SS, and the transceiver for receiving the channel quality reports from the SS, and for exchanging data with the SS together with the at least one slave BS depending on an instruction of the controller.

In accordance with yet another aspect of the present invention, a slave BS for providing a service to a SS in a next-generation wireless communication system is provided. The slave BS includes a controller for controlling a transmitter to transmit data to an SS using resources allocated from a master BS serving the SS, and to transmit transmission results for the data to the master BS and at least one slave BS that constitutes a first cloud cell for the SS. The first cloud cell may have member BSs including the master BS and the at least one slave BS.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Figure 1:
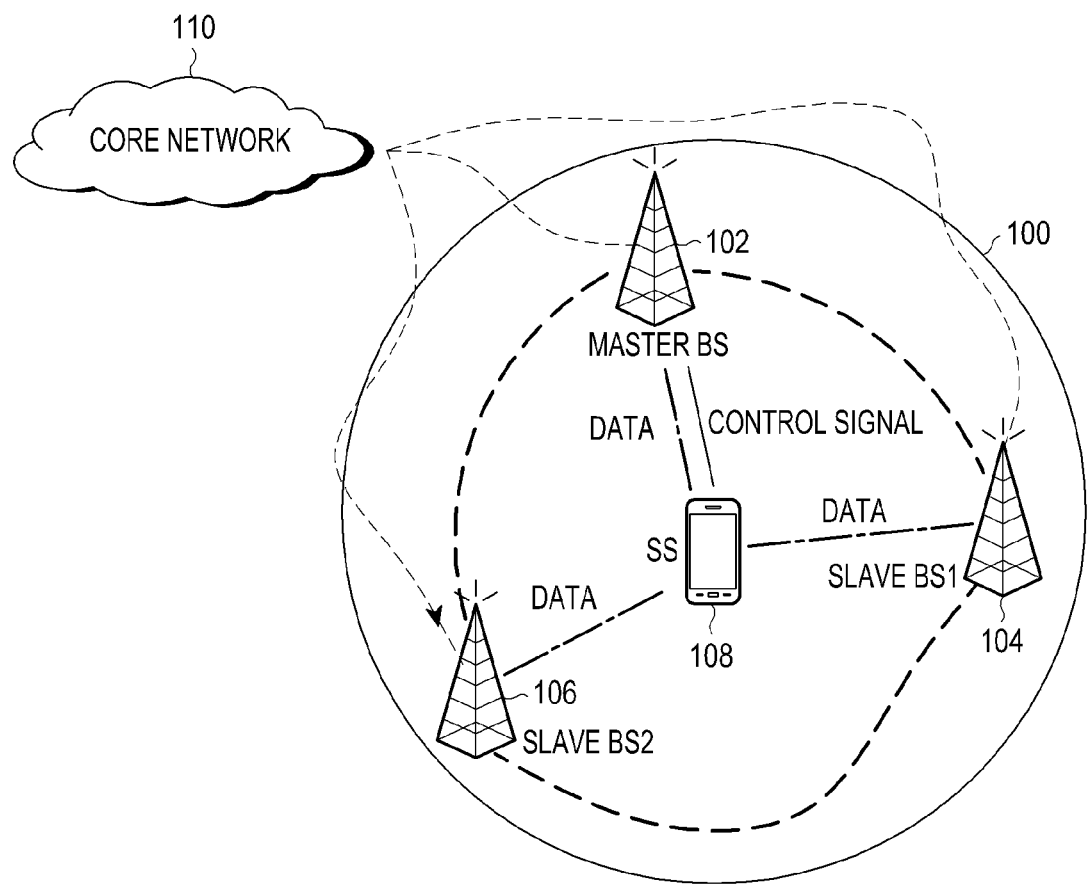
FIG. 1 illustrates a configuration of a cloud cell according to a first exemplary embodiment of the present invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention propose a cloud cell designed to provide more efficient services to users considering the characteristics of high-frequency bands to be used in the next-generation wireless communication system. Notably, exemplary embodiments of the present invention can also be applied to regular cellular bands where hyper-dense deployments with small Base Station (BS) coverage are used. The cloud cell defined in this specification is a virtual cell including a plurality of BSs (hereinafter referred to as 'member BSs') providing services to one Subscriber Station (SS), and the BSs operate in mmWave bands. Again however, the invention may be applied to communication systems using any cellular band.

An exemplary cloud cell proposed by the present invention has the following configuration.

At network entry, an SS may enter a beamformed system by attaching to one BS, and may later connect to multiple BSs. The BS that the SS first accesses operates as a master BS (or a main BS) of a virtually configured cloud cell to provide a service to the SS.

The master BS is one of the member BSs, and controls operations of the remaining member BSs in the cloud cell. Among the member BSs, the remaining member BSs except for the master BS operate as slave BSs (or secondary BSs). A slave BS in a first cloud cell may operate as a master BS or a slave BS in at least one other cloud cell except for the first cloud cell (i.e., a cloud cell has only one Master BS). Similarly, a master BS operating as a master BS in a first cloud cell may also operate as a master BS or a slave BS in at least one other cloud cell except for the first cloud cell.

Member BSs in one cloud cell may be physically connected to each other in a wired or wireless manner.

FIG. 1 illustrates a configuration of a cloud cell according to a first exemplary embodiment of the present invention.

Referring to FIG. 1, a cloud cell 100 includes an SS 108, and for example, three member BSs 102, 104 and 106 transmitting data to the SS 108. In the illustrated example of FIG. 1, the number of member BSs constituting the cloud cell 100 is three. However, this is merely for convenience of description, and it will be noted that the number of member BSs constituting the cloud cell is subject to change. In the illustrated example of FIG. 1, the member BS 102 operates as the master BS, while the member BS 104 and the member BS 106 each operate as a slave BS.

The master BS 102 may transmit both control signals and data to the SS 108, and manages the slave BS1 104 and the slave BS2 106.

Each of the slave BS1 104 and the slave BS2 106 may transmit only data to the SS 108 without transmitting control signals, unless it receives a specific instruction from the master BS 102. The slave BS1 104 and the slave BS2 106 may also transmit control information to the SS 108 depending on an instruction of the master BS 102. The data that the master BS 102 transmits to the SS 108 may be equal to or different from the data that the slave BS1 104 and the slave BS2 106 transmit to the SS 108.

The master BS 102, the slave BS1 104, and the slave BS2 106 are each directly connected to a core network 110. Also, the master BS 102, the slave BS1 104, and the slave BS2 106 may be directly connected to each other in a wired or wireless manner.

All of the master BS 102, the slave BS1 104, and the slave BS2 106 may serve the SS 108, thereby increasing reliability in that at least one or more of the multiple links may have sufficient quality to support higher data rates. Also, the master BS 102, the slave BS1 104, and the slave BS2 106 may provide one or multiple links having improved signal quality to the SS 108, thereby increasing data throughput. The cloud cell 100 is configured to provide high-speed data services to the SS 108, and it will be apparent to those of ordinary skill in the art that the cloud cell 100 is beneficial in providing increased throughput and reliability even though the SS 108 is not located at the edge of the cell.

In the cloud cell 100, the master BS 102, the slave BS1 104, and the slave BS2 106 may transmit data to the SS 108 simultaneously or at different times. Similarly, the SS 108 may transmit data to the master BS 102, the slave BS1 104, and the slave BS2 106 simultaneously or at different times. To this end, the SS 108 may include multiple Radio Frequency (RF) chains for communication with multiple BSs. However, the SS 108 does not necessarily require multiple RF chains to communicate with different BSs. For example, when using one RF chain, the SS 108 may exchange data with the BSs 102, 104 and 106 at different times. The cloud cell 100 may reconfigure or update its member BSs depending on the communication state between the SS 108 and the BSs. More specifically, a certain BS may be excluded from the cloud cell 100 if there is a sustained low quality communication link with the SS 108 (i.e., low signal quality, larger latencies in packet delivery/reception, etc.).

In the first exemplary embodiment of the present invention, roles of member BSs and an SS will be described in more detail based on the operation of transmitting data to the SS in a cloud cell.

Figure 2:
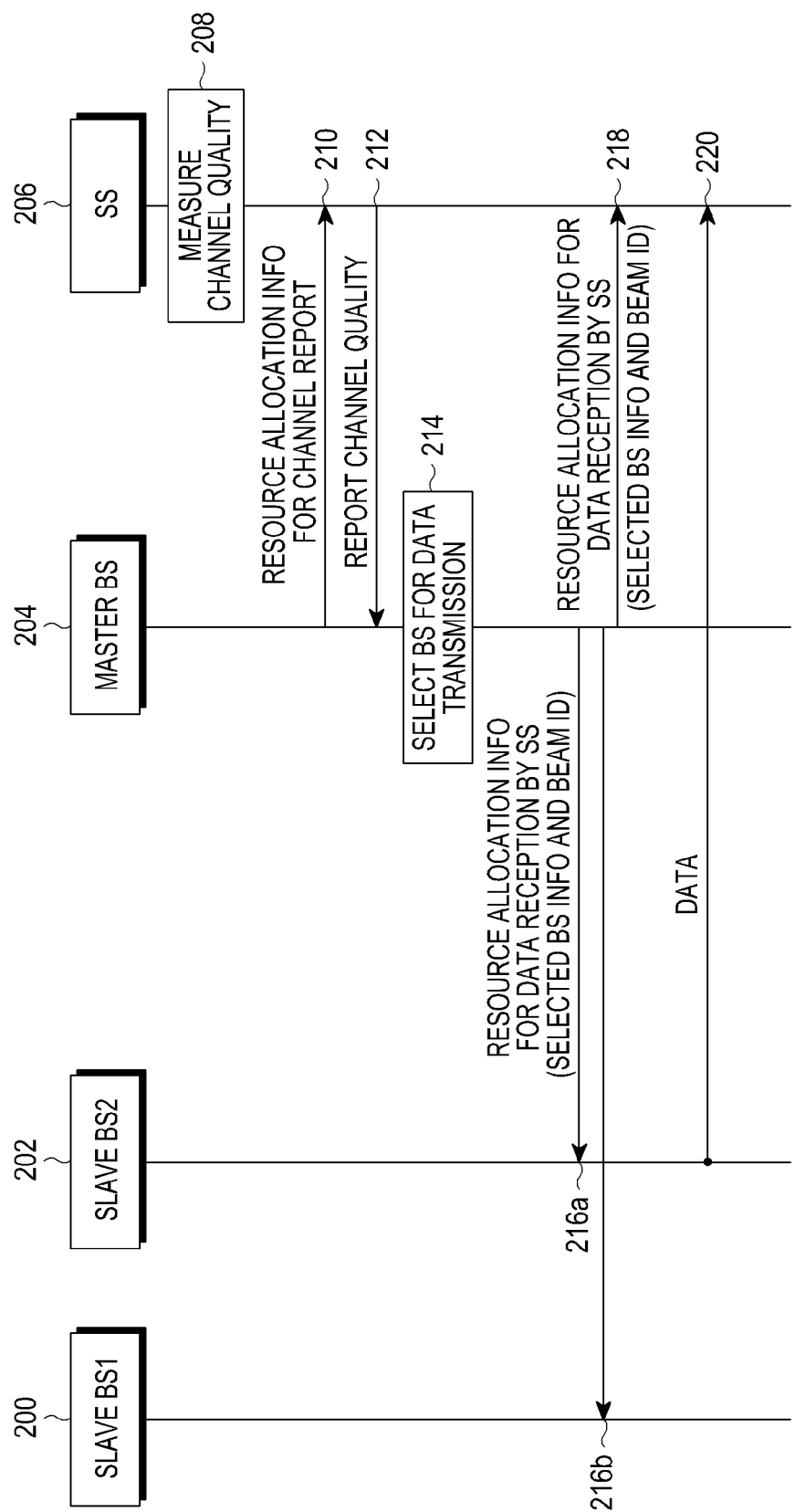
FIG. 2 is a flow diagram illustrating a data transmission/reception operation in a cloud cell according to the first exemplary embodiment of the present invention.

FIG. 2 is a flow diagram illustrating a data transmission/reception operation in a cloud cell according to the first exemplary embodiment of the present invention. In the following description, the number of member BSs constituting the cloud cell is assumed to be three. However, it is to be understood that this is merely for convenience of description, and it should be noted that the number of member BSs constituting the cloud cell can change without departing from the scope and spirit of the invention.

Referring to FIG. 2, a cloud cell is considered, which includes member BSs (i.e., a master BS 204, a slave BS1 200, and a slave BS2 202) serving an SS 206. The basic configuration and operation of the cloud cell are substantially the same as described in FIG. 1. In step 208, the SS 206 measures channel qualities for nearby BSs. The nearby BSs include not only member BSs in the cloud cell, but also BSs other than the member BSs. The SS 206 measures channel qualities of the member BSs at predefined regular periods or aperiodically, and measures channel qualities for BSs other than the member BSs at intervals of a period longer than the stated period or at stated periods. For example, the channel qualities include Physical Cell Identities (PCIDs) for BSs from which the SS can receive data, and Received Signal Strength Indication (RSSI)/Carrier to Interference plus Noise Ratio (CINR) for each PCID. The PCID and RSSI/CINR represent examples of an ID and channel quality information of each BS. However, it is to be understood that this is merely for convenience of description. That is, in the present invention, various types of BS IDs and channel quality information may be used.

In step 210, the master BS 204 allocates resources for a channel report by the SS 206, and transmits the resource allocation information. In step 212, the SS 206 transmits a channel quality report to the master BS 204 using resources corresponding to the resource allocation information. For example, the channel quality report may include channel quality values (i.e., PCIDs and RSSI/CINR for each PCID) that the SS 206 has measured from the nearby BSs, the best transmit/receive beam direction, and the like. The best transmit/receive beam direction refers to a transmit/receive beam direction having the optimal or highest channel quality or the maximum signal strength in the system to which beamforming is applied.

Upon receiving the channel quality report from the SS 206, the master BS 204 determines a member BS that will transmit data to the SS 206, based on the channel quality values included in the channel quality report, in step 214. After allocating resources for data reception by the SS 206, the master BS 204 transmits resource allocation information for data reception by the SS 206 to the slave BS1 200 and the slave BS2 202 in steps 216b and 216a, respectively.

In step 218, the master BS 204 transmits resource allocation information for data reception by the SS 206, to the SS 206. For example, the resource allocation information for data reception by the SS 206 may include information about a selected BS and beam ID indicating the optimal beam direction. Through steps 216a and 216b, the member BSs included in the cloud cell may acquire information about a slave BS (for example, the slave BS2 202) that will transmit data to the SS 206, thereby making it possible to avoid transmission by other member BSs during data transmission, contributing to minimization of interference. Although it is assumed in the example of FIG. 2 that one slave BS (for example, the slave BS2 202) is selected as a BS that will transmit data, multiple slave BSs (for example, the slave BS1 200 and the slave BS2 202) may all be selected as BSs that will transmit data.

Thereafter, the slave BS2 202, which has recognized that the slave BS2 202 itself is a selected BS, based on the BS information acquired from the resource allocation information for data reception by the SS 206, transmits data to the SS 206 in step 220.

Although not shown in the drawing, the data mentioned above is the data that the slave BS2 202 has received via the master BS 204. The master BS 204 receives the results on data transmission by the selected slave BSs from the SS 206 in the form of, for example, an ACK/NACK signal. If there is data for which a NACK signal has occurred, the master BS 204 may manage retransmission of the NACKed data, which may not necessarily be through the same BS that transmitted the original data.

Figure 3:
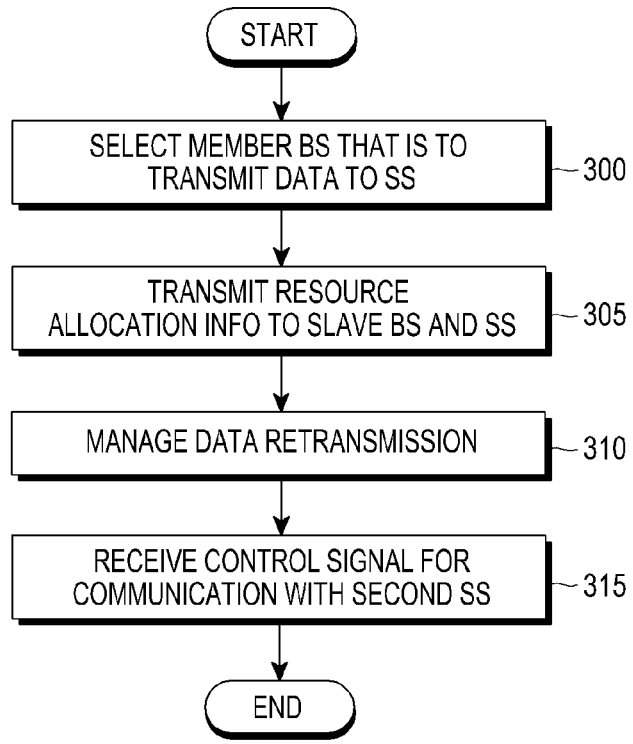
FIG. 3 is a flowchart illustrating a master Base Station's (BS's) operation of controlling data transmission to a Subscriber Station (SS) in a cloud cell according to the first exemplary embodiment of the present invention.

FIG. 3 is a flowchart illustrating a master BS's operation of controlling data transmission to an SS in a cloud cell according to the first exemplary embodiment of the present invention.

In the following description, it is assumed that the master BS transmitted resource allocation information for a channel quality report by the SS, to the SS, and has received channel quality reports from the SS through resources corresponding to the resource allocation information. The channel quality reports received from the SS may include channel quality reports for the BSs, whose channel qualities can be measured by the SS, as well as for the member BSs in the cloud cell.

Referring to FIG. 3, in step 300, the master BS selects a member BS that will transmit data to the SS, based on one of the channel quality values, load, remaining power (in case of energy harvesting BS), whether a BS is backhauled to the network or not, etc. acquired from the channel quality report received from the SS. The channel quality report includes PCIDs for nearby BSs whose channel qualities are measured by the SS, RSSI/CINR for each PCID, and the best transmit beam direction. As an example, the master BS determines a BS having the best RSSI/CINR among the RSSI/CINR values included in the channel quality report, as a BS that will transmit data to the SS.

In step 305, the master BS transmits resource allocation information, for data transmission to the SS, to each of the slave BSs and the SS. For example, the resource allocation information includes information about the selected BS, and an ID of the beam providing the optimal channel quality.

In step 310, the master BS receives the reception results for the data transmission by the selected slave BS from the SS in the form of, for example, an ACK/NACK signal. The master BS manages retransmission for the data for which a NACK signal has occurred, based on the reception results. For example, if the number of occurrences of a NACK signal exceeds a threshold as an arbitrary slave BS continuously generates the NACK signal, the master BS may determine another slave BS other than the current slave BS, as a BS that will transmit data to the SS. In step 315, the master BS receives a control signal from a master BS of a second SS. The second control signal relates to a communication with the second SS.

More specifically, the master BS may determine whether to maintain the current member BSs of the cloud cell based on the reception results for the data transmission by the member BSs, received from the SS. For example, for an arbitrary slave BS, if the number of occurrences of a NACK signal exceeds a threshold, the master BS may exclude the slave BS that generated the NACK signal from the member BSs in the cloud cell. The master BS may determine a BS having the highest channel quality value as a new member BS, based on the channel quality values for the BSs other than the member BSs included in the channel quality report received from the SS.

Although not shown in the drawing, the master BS delivers the current configuration information for the cloud cell to the network, for multicast communication from the network to the member BSs. The configuration information includes, for example, an ID of the cloud cell, and an ID and role information for each of member BSs of the cloud cell. The role information indicates whether a member BS operates as a master BS or a slave BS.

Figure 4:
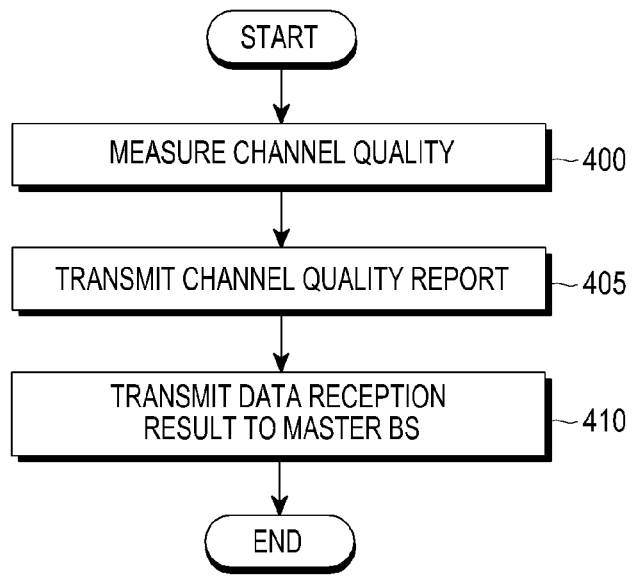
FIG. 4 is a flowchart illustrating an operation of an SS in a cloud cell according to the first exemplary embodiment of the present invention.

FIG. 4 is a flowchart illustrating an operation of an SS in a cloud cell according to the first exemplary embodiment of the present invention.

Referring to FIG. 4, the SS measures channel qualities for nearby BSs in step 400. The nearby BSs may include member BSs in the cloud cell, and may also include BSs other than the member BSs. For example, the SS measures channel qualities for the member BSs at stated periods or aperiodically, and may measure channel qualities for nearby BSs other than the member BSs at intervals of a period longer than the stated period or at stated periods. For example, the channel qualities include a beam and a PCID for each of the member BSs in the cloud cell and other nearby BSs, and RSSI/CINR for each PCID. Then, the SS determines the best transmit beam among the transmit beams of the member BSs in the cloud cell, and acquires timing information for the best transmit beam.

In step 405, the SS transmits a channel quality report including values of the measured channel qualities to the master BS using resources corresponding to the resource allocation information received from the master BS. For example, the channel quality report includes channel quality values (i.e., PCIDs for the nearby BSs, RSSI/CINR for each PCID, and the best transmit beam direction) that the SS has measured for the nearby BSs.

Thereafter, in step 410, upon receiving data from an arbitrary BS, the SS determines reception results for the data and transmits the reception results to the master BS. For example, the reception results are represented for each member BS individually in the form of an ACK/NACK signal, and used by the master BS to determine whether to retransmit the data.

Figure 5:
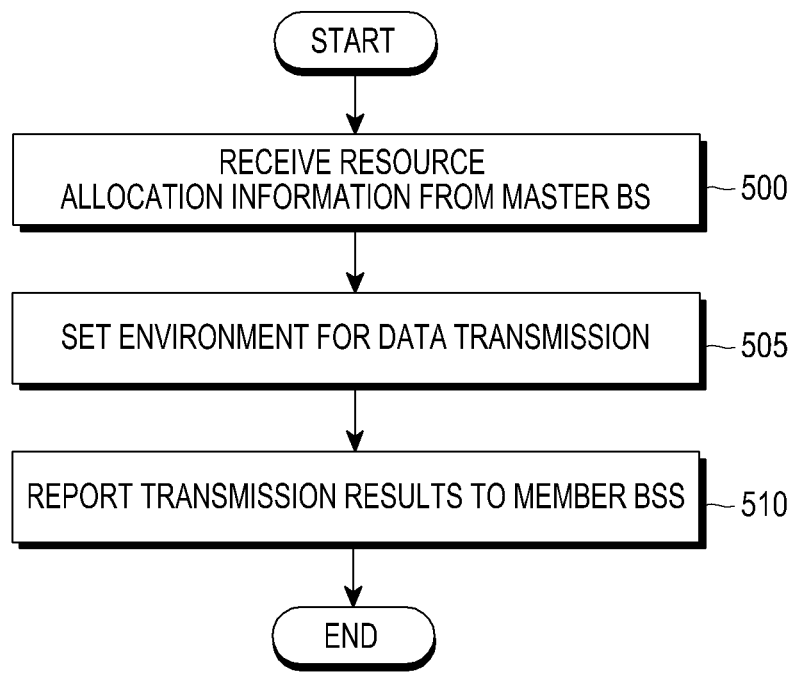
FIG. 5 is a flowchart illustrating an operation of a slave BS according to the first exemplary embodiment of the present invention.

FIG. 5 is a flowchart illustrating an operation of a slave BS according to the first exemplary embodiment of the present invention. It is assumed herein that the slave BS is a BS that is determined by the master BS and will transmit data to an SS in the cloud cell.

Referring to FIG. 5, the slave BS receives resource allocation information from the master BS in step 500. Based on the BS information included in the resource allocation information, the slave BS recognizes that the slave BS itself is a BS that will transmit data to the SS. In step 505, the slave BS sets an environment for transmission of the data, and then transmits the data to the SS. For example, the slave BS determines a Modulation and Coding Scheme (MCS) level at a time for the transmission, considering channel quality values included in the channel quality report received from the master BS, and the data that is received from the master BS.

After transmitting the data, the slave BS transmits transmission results for the data to member BSs including the master BS, in step 510.

Operations of member BSs and an SS during a handover situation where the master BS in the cloud cell is changed will be described below according to a second exemplary embodiment of the present invention.

As for a cloud cell proposed in an exemplary embodiment of the present invention, if one SS accesses one BS by means of network entry in a system where beams are formed, the cloud cell is configured by virtually grouping BSs for providing services to the SS. More specifically, the BS that the SS initially accessed operates as a master BS of the cloud cell. Thereafter, the SS periodically measures channel qualities for the BSs from which it can receive data. The SS transmits a channel quality report including the measured channel qualities to the master BS. The master BS selects member BSs of the cloud cell based on the channel quality values included in the channel quality report, and provides information about the selected member BSs to the related BSs and the SS. For example, the master BS selects, as member BSs of the cloud cell, BSs having RSSI or CINR among the channel quality values, which is greater than or equal to a predetermined threshold.

Thereafter, if the selection of member BSs of the cloud cell for the SS is completed, the master BS delivers the current configuration information of the cloud cell to the network. The configuration information includes, for example, an ID of the cloud cell, and IDs and role information for member BSs of the cloud cell. The role information indicates whether a member BS operates as a master BS or a slave BS. All of the member BSs may receive, from the network, the data that needs to be delivered to the SS. Upon receiving the data from the network, the master BS selects a slave BS that will transmit the data, based on the channel quality report received from the SS. The master BS instructs transmission of the data by delivering the data and resource allocation information for transmission of the data to the selected slave BS. The master BS receives reception results for the data from the SS.

The master BS receives the current load information of a BS from each of the slave BSs. Based on the load value included in the load information, the master BS determines whether to maintain each of the slave BSs as a member BS of the current cloud cell. For example, the master BS compares the current load value for each of the slave BSs with a threshold. If the current load information includes a load value exceeding the threshold, the master BS excludes the slave BSs that transmitted the current load information from the member BSs in the cloud cell. However, if the current load value is less than or equal to the threshold, the master BS maintains the slave BS that transmitted the current load information as a member BS.

Based on the channel quality information received from the SS, the master BS determines whether to change the master BS of the cloud cell, i.e., determines if a handover is necessary or otherwise advantageous. For example, the master BS determines to change the master BS of the cloud cell if it is determined that RSSI/CINR included in a channel quality report for an arbitrary BS, received from the SS, exceeds a threshold, the number of times that the RSSI/CINR exceeded the threshold is greater than or equal to a predetermined number, and the arbitrary BS is not overloaded. In such a case, the master BS changes the arbitrary BS to a master BS of the cloud cell. After the change, the master BS notifies the change results for the master BS to the SS and the changed master BS. The arbitrary BS may be one of the slave BSs in the cloud cell, or one of the other BSs from which the SS can receive data. For example, the change results include an action time defined by the master BS, and a transmit beam ID. The action time is configured in units of frames or subframes, and represents the time at which the changed master BS operates as a master BS. The transmit beam ID is used by the master BS to receive a control signal from the changed master BS.

Figure 6:
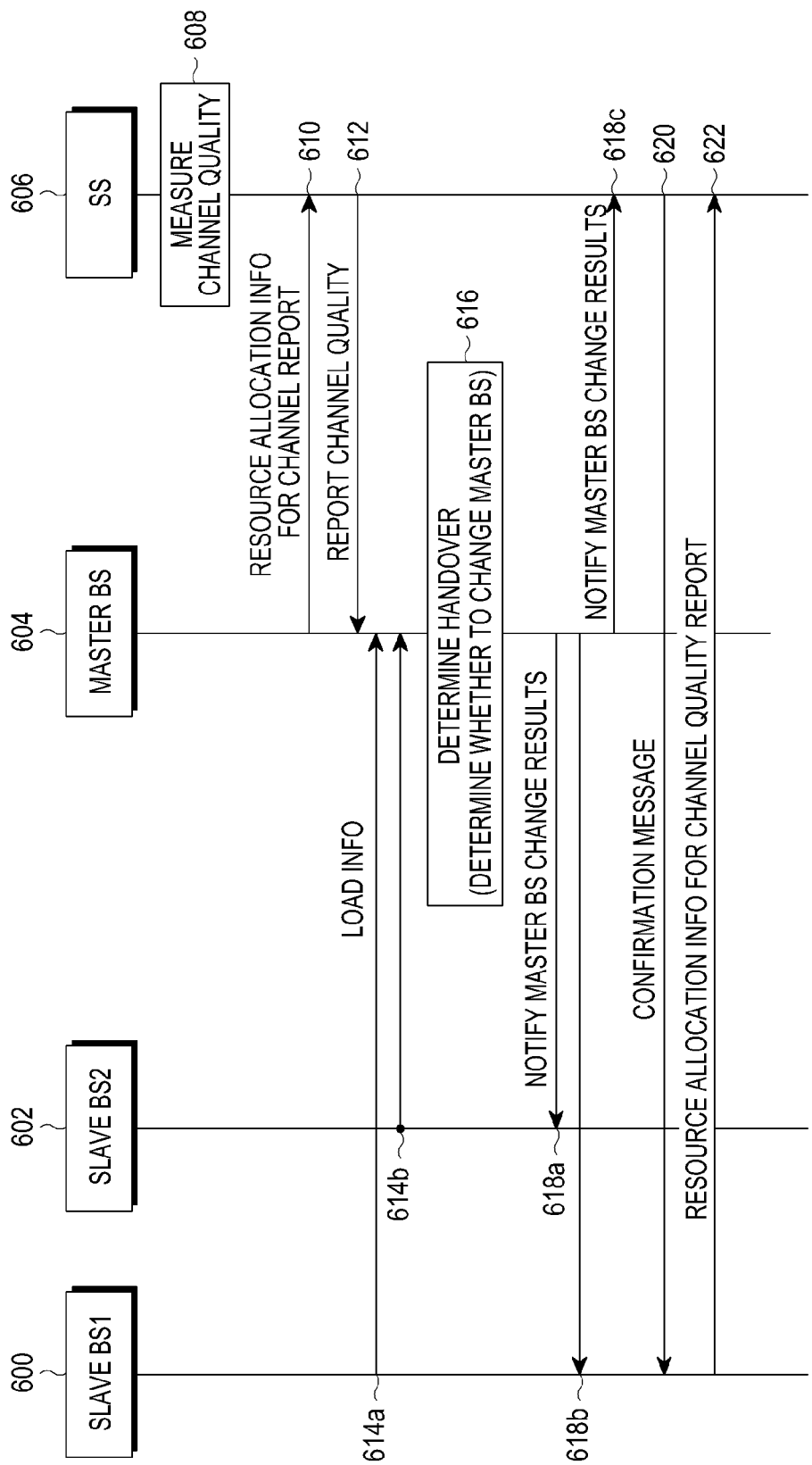
FIG. 6 is a flow diagram illustrating an operation of changing a master BS according to a second exemplary embodiment of the present invention.

FIG. 6 is a flow diagram illustrating an operation of changing a master BS according to a second exemplary embodiment of the present invention. In the following description, the number of member BSs constituting the cloud cell is assumed to be three. However, it is to be understood that this is merely for convenience of description, and it should be noted that the number of member BSs constituting the cloud cell is subject to change.

Referring to FIG. 6, a cloud cell is considered, which includes member BSs (i.e., a master BS 604, a slave BS1 600, and a slave BS2 602) transmitting data to an SS 606. In step 608, the SS 606 measures channel qualities for nearby BSs. The nearby BSs include not only member BSs in the cloud cell, but also BSs other than the member BSs. The channel qualities include PCIDs for BSs from which the SS can receive data, and RSSI/CINR for each PCID.

In step 610, the master BS 604 transmits resource allocation information indicating resources allocated for a channel report by the SS 606. In step 612, the SS 606 transmits a channel quality report to the master BS 604 using resources corresponding to the resource allocation information. For example, the channel quality report includes PCIDs for the nearby BSs, RSSI/CINR for each PCID, and the best transmit beam direction. The slave BS1 600 and the slave BS2 602 transmit load information indicating their own load state to the master BS 604 in steps 614a and 614b, respectively. Although not shown in the drawing, the load information transmission operation in steps 614a and 614b may be performed if there is a request from the master BS 604, or may be performed in such a manner that the slave BS1 600 and the slave BS2 602 transmit load information periodically or aperiodically even though there is no request from the master BS 604.

In step 616, the master BS 604 determines whether to change the current master BS in the cloud cell, i.e., determines a handover. In this specification, the master BS before the change will be referred to as a current master BS, in order to distinguish it from a master BS that is changed after the handover.

The master BS 604 considers the load information received from each of the slave BS1 600 and the slave BS2 602 and the channel quality report received from the SS 606. For example, the master BS 604 determines whether there is a BS having RSSI/CINR exceeding a threshold, among the RSSI/CINR values included in the channel quality report. If there is a specific BS having RSSI/CINR exceeding the threshold, the master BS 604 determines whether the number of times that the RSSI/CINR of the specific BS exceeded the threshold is greater than or equal to a predetermined number. The specific BS is assumed to be one of the member BSs. The master BS 604 determines to change the specific BS to a new master BS in the cloud cell if it is determined from the load information received from the specific BS that the BS is not in overload state. For example, the overload state may be determined according to whether the current load value included in the load information of the specific BS exceeds a threshold.

It will be assumed herein that the master BS 604 determines the slave BS1 600 as a master BS changed after handover.

The master BS 604 delivers a result notification indicating that the slave BS1 600 is changed to a master BS in the cloud cell, to each of the slave BS1 600 and the slave BS2 602 in steps 618b and 618a, respectively.

Similarly, in step 618c, the master BS 604 transmits the result notification to the SS 606. The result notification may include information about the BS changed to a master BS, and information about the time at which the changed BS starts operating as a master BS.

In step 620, the SS 606 sends a confirmation message for the result notification to the slave BS1 600, informing the slave BS1 600 that the SS 606 has recognized that the changed master BS is the slave BS1 600.

Upon receiving the confirmation message, the slave BS1 600 performs a master BS's operation of transmitting resource allocation information for a channel quality report to the SS 606 in step 622. More specifically, the slave BS1 600 operating as a master BS in the cloud cell operates as in FIG. 3 of the first exemplary embodiment and in FIG. 7 of the second exemplary embodiment.

Figure 7:
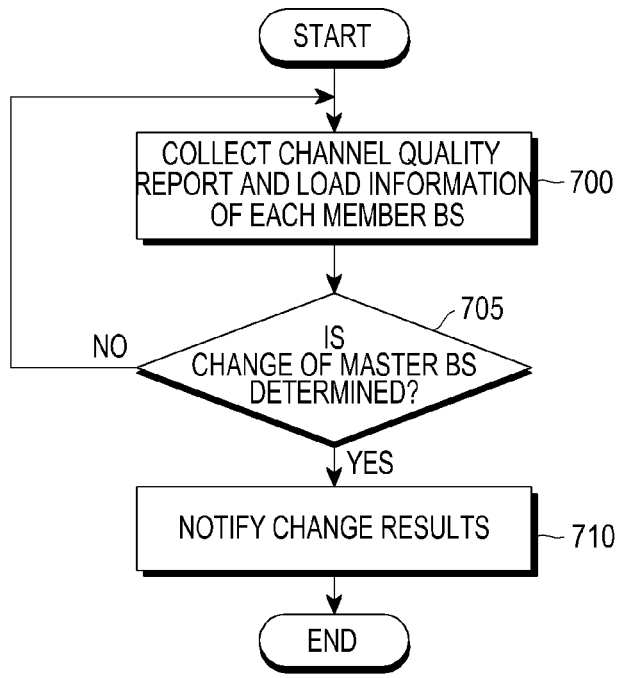
FIG. 7 is a flowchart illustrating a current master BS's operation of changing a master BS in a cloud cell according to the second exemplary embodiment of the present invention.

FIG. 7 is a flowchart illustrating a current master BS's operation of changing a master BS in a cloud cell according to the second exemplary embodiment of the present invention. In this specification, the master BS before the change will be referred to as a current master BS, in order to distinguish it from a master BS that is changed after the handover.

Referring to FIG. 7, in step 700, the current master BS collects a channel quality report received from an SS and the current load information received from each member BS. The channel quality report includes PCIDs for nearby BSs of the SS, and RSSI/CINR for each PCID, and the nearby BSs include the member BSs and other BSs.

In step 705, the current master BS determines whether to change the current master BS of the cloud cell, based on the channel quality report and the current load information. For example, the current master BS determines whether there is a BS having RSSI/CINR exceeding a threshold, among the RSSI/CINR values included in the channel quality report. It will be assumed that there is a specific BS having RSSI/CINR exceeding the threshold. The specific BS may be any one of the member BSs in the cloud cell and the other BSs. Herein, the specific BS is assumed to be one of the member BS, and the current master BS determines whether the number of times that the RSSI/CINR of the specific BS exceeded the threshold is greater than or equal to a predetermined number. If the number of times is also greater than or equal to the predetermined number, the current master BS determines the current load information of the specific BS. Specifically, the current master BS acquires the current load value of the specific BS from the current load information. The current master BS determines whether the specific BS is in overload state by determining whether the current load value exceeds a threshold. If the specific BS is not in overload state, the current master BS determines to change the specific BS to a master BS in the cloud cell.

In step 710, the current master BS transmits a result notification indicating that the master BS in the cloud cell is changed to the specific BS, to each of the SS and the slave BSs. The change result notification may include information about the changed specific BS, and information (hereinafter, operation time information) about the time at which the specific BS starts operating as a master BS.

Figure 8:
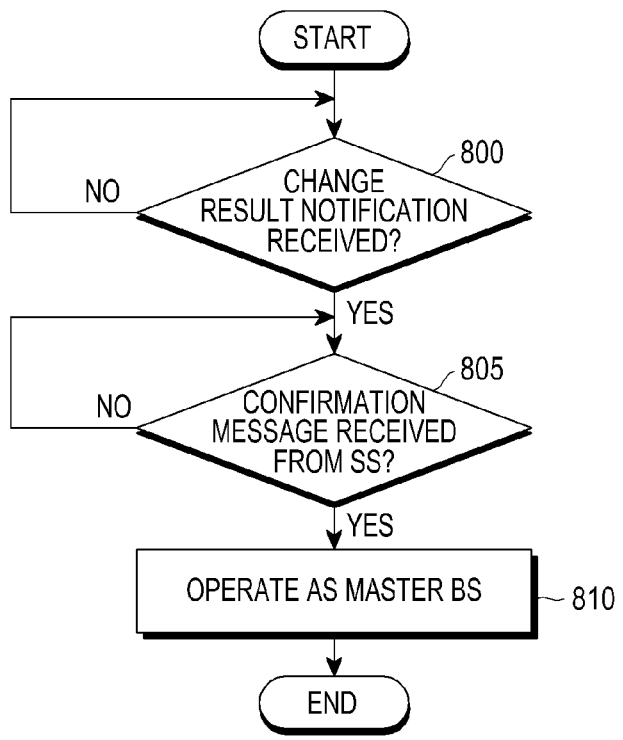
FIG. 8 is a flowchart illustrating an operation of a slave BS changed to a master BS in a cloud cell according to the second exemplary embodiment of the present invention.

FIG. 8 is a flowchart illustrating an operation of a slave BS changed to a master BS in a cloud cell according to the second exemplary embodiment of the present invention.

Referring to FIG. 8, the slave BS determines in step 800 whether a result notification has been received from the master BS. If the result notification has not been received, the slave BS in the cloud cell operates under control of the master BS. More specifically, the slave BS waits to receive the result notification, operating as a slave BS that operates under control of the current master BS as in FIG. 5.

Upon receiving the result notification, the slave BS determines its own ID based on BS information included in the result notification, and recognizes the time at which it starts operating as a master BS, based on the operation time information acquired from the result notification. In step 805, the slave BS waits to receive a confirmation message from the SS. The confirmation message indicates that the SS has recognized that the slave BS is changed to a master BS in the cloud cell.

In step 810, the slave BS operates as a master BS in the cloud cell at the time corresponding to the operation time information. Specifically, the slave BS controls data transmission to the SS in the cloud cell, and determines handover. In other words, the slave BS operates as in FIG. 4 for the first exemplary embodiment and in FIG. 7 for the second exemplary embodiment.

Figure 9:
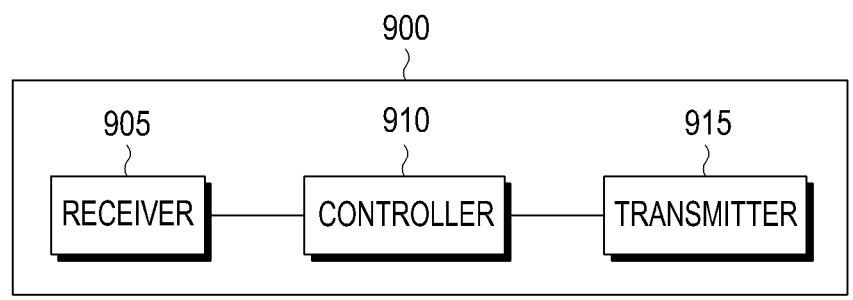
FIG. 9 illustrates a schematic structure of an apparatus according to an exemplary embodiment of the present invention.

FIG. 9 illustrates a schematic structure of an apparatus according to exemplary embodiments of the present invention.

Referring to FIG. 9, the apparatus 900 includes a receiver 905, a controller 910 and a transmitter 915, and may operate as an SS, a slave BS or a master BS according to exemplary embodiments of the present invention as described above.

First, reference will be made to the apparatus 900 that operates as a master BS according to the first exemplary embodiment of the present invention.

In this case, the controller 910 allocates resources for a channel quality report by an SS and controls the transmitter 915 to transmit resource allocation information for the resource allocation to the SS. The receiver 905 receives a channel quality report from the SS. The channel quality report includes channel quality values (i.e., PCIDs for the nearby BSs, RSSI/CINR for each PCID, and the best transmit beam direction) that the SS has measured for the nearby BSs. The controller 910 may determine a BS having the best RSSI/CINR, among RSSI/CINR values included in the channel quality report, as a BS that will transmit data to the SS. Further, the controller 910 controls the transmitter 915 to transmit resource allocation information, for data transmission to the SS, to the SS and slave BSs. The resource allocation information includes information about the selected BS and an ID of the best transmit beam. Upon receiving reception results for the data from the SS, the controller 910 determines whether to retransmit the data and whether to maintain the current configuration of the cell cloud, based on the reception results. A description thereof has been made in conjunction with FIG. 3.

The transmitter 915 delivers the current configuration information for the cloud cell to the network, for multicast communication from the network to the member BSs. The configuration information includes, for example, an ID of the cloud cell, and IDs and role information of the member BSs in the cloud cell. The role information indicates whether a member BS operates as a master BS or a slave BS.

Next, reference will be made to the apparatus 900 that operates as a slave BS according to the first exemplary embodiment of the present invention.

In this case, if the receiver 905 receives resource allocation information from the master BS, the controller 910 recognizes that the apparatus 900 itself is a BS that will transmit data to the SS, by determining its own ID included in the resource allocation information. Then, the controller 910 determines an environment (for example, an MCS level) for transmission of the data, and controls the transmitter 915 to transmit the data received from the master BS to the SS. If the transmitter 915 transmits the data, the controller 910 notifies the transmission results for the data to the member BSs including the master BS.

In the case where the apparatus 900 operates as an SS according to the first exemplary embodiment of the present invention, the controller 910 may measure channel qualities for the nearby BSs and generate a channel quality report based thereon. The controller 910 delivers the channel quality report to the master BS by means of the transmitter 915. The nearby BSs include member BSs in the cloud cell and BSs other than the member BSs. The SS measures channel qualities of the member BSs at stated periods, and measures channel qualities for the BSs other than the member BSs at intervals of a period longer than the stated period. The channel qualities include beams and PCIDs for the member BSs in the cloud cell and the other BSs, and RSSI/CINR for each PCID. The SS determines the best transmit beam among the transmit beams of the member BSs in the cloud cell, and acquires time information for the best transmit beam. The channel quality report includes PCIDs for the BSs from which the SS can receive data, RSSI/CINR for each PCID, and the best transmit beam direction.

Thereafter, if the receiver 905 receives data, the controller 910 delivers the reception results for the data to the master BS in the form of an ACK/NACK signal.

Next, reference will be made to the apparatus 900 that operates as a master BS according to the second exemplary embodiment of the present invention.

In this case, the controller 910 collects a channel quality report that the receiver 905 receives from the SS, and the current load information of each member BS, and, based thereon, determines whether to change the current master BS in the cloud cell, i.e., determines a handover. More specifically, the controller 910 determines whether there is a BS having the RSSI/CINR exceeding a threshold, among the channel quality values acquired from the channel quality report. If there is a specific BS having the RSSI/CINR exceeding the threshold, the controller 910 determines whether the number of times that RSSI/CINR of the specific BS exceeded the threshold is greater than or equal to a predetermined number. The specific BS may be one of the member BSs, or one of BSs other than the member BSs. The controller 910 determines whether the specific BS is in overload state, by comparing the current load value acquired from the current load information received from the specific BS, with a threshold. If the specific BS is not in overload state, the controller 910 determines the specific BS as a master BS in the cloud cell. After the change, the controller 910 controls the transmitter 915 to send a result notification to the SS and the member BSs. The result notification may include information about a specific BS changed to a master BS, and information about the time at which the specific BS starts operating as a master BS.

In the case where the apparatus 900 operates as a slave BS according to the second exemplary embodiment of the present invention, the controller 910 waits for a result notification from the master BS. If the receiver 905 receives the result notification, the controller 910 recognizes that the apparatus 900 itself is changed to a master BS of the cloud cell. The apparatus 900 operates as a slave BS until the receiver 905 receives a confirmation message from the SS. Thereafter, if the receiver 905 receives the confirmation message from the SS, the controller 910 operates as a master BS as, for example, in FIG. 3.

Using the cloud cell configured as described above, exemplary embodiments of the present invention may increase the reliability of links having low signal strength in high-frequency bands and provide a plurality of excellent links to the SS, contributing to an increase in data throughput.

As is apparent from the foregoing description, a plurality of member BSs constituting a cloud cell may serve one SS, considering the characteristics of high-frequency bands to be used in the next-generation wireless communication system, thereby increasing the reliability of links having low signal strength in high-frequency bands and providing a plurality of quality links to the SS, contributing to an increase in data throughput.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for communicating at a master base station (BS) in a wireless communication system, the method comprising:
    transmitting, to a member BS, a first control signal for a first communication with a first user equipment (UE);
    performing the first communication with the first UE;
    while performing the first communication with the first UE, determining whether at least one additional member BS is able to perform the first communication based on measurements reported from the first UE;
    if the at least one additional member BS is able to perform the first communication, transmitting, to the first UE, information related to the at least one additional member BS; and
    while performing the first communication, receiving, from a master BS of a second UE, a second control signal for a second communication with the second UE, wherein the second control signal indicates that the master BS of the first UE is added as a new member BS for the second communication.

2. The method of claim 1, further comprising:
    determining whether to release a connection established with the member BS.

3. The method of claim 2, wherein the releasing of the connection is determined while performing the second communication.

4. The method of claim 1, wherein the second control signal indicates releasing of a connection established with the master BS of the second UE, and
    wherein, while performing the first communication, the releasing of the connection established with the master BS of the second UE is determined by the master BS of the second UE.

5. A method for communicating at a member base station (BS), the method comprising:
    receiving, from a master BS performing a first communication with a first user equipment (UE), a first control signal for the first communication with the first UE;
    performing the first communication with the first UE based on the first control signal; and
    while performing the first communication, transmitting, to a member BS of a second UE, a second control signal for a second communication with the second UE, wherein the second control signal indicates that the master BS of the first UE is added as a new member BS for the second UE.

6. The method of claim 5, wherein, while performing the first communication, determining whether to release a connection established with the member BS of the second UE.

7. The method of claim 5, wherein the transmitting of the second control signal comprises:
    determining whether at least one additional member BS is able to perform the second communication based on measurements reported from the second UE; and
    if the at least one additional member BS is able to perform the second communication, transmitting, to the second UE, information related to the at least one additional member BS.

8. A method for communicating at a first user equipment (UE) in a wireless communication system, the method comprising:
    performing a first communication with at least one of a master base station (BS) and a member BS;
    reporting, to the master BS, measurements for the first communication;
    receiving, from the master BS of the first UE, information related to at least one additional member BS to perform the first communication determined based on the measurements; and
    establishing a connection with the at least one additional member BS,
    wherein the information related to the at least one additional member BS is received from the master BS to receive a second control signal for a second communication with a master BS of a second UE while performing the first communication,
    wherein the second control signal indicates that the master BS of the first UE is added as a new member BS for the second communication.

9. The method of claim 8, wherein releasing of a connection established with the member BS is determined by the master BS to perform the second communication with the master BS of the second UE.

10. A master base station (BS) for communicating in a wireless communication system, the master BS comprising:
    a transceiver configured to transmit, to a member BS, a first control signal for a first communication with a first user equipment; and
    at least one processor configured to:
        perform the first communication with the first UE,
        while performing the first communication with the first UE, determine whether at least one additional member BS is able to perform the first communication based on measurements reported from the first UE, and
        if the at least one additional member BS is able to perform the first communication, control the transceiver to transmit, to the first UE, information related to the at least one additional member BS,
    wherein while performing the first communication, the transceiver is further configured to receive, from a master BS of a second UE, a second control signal for a second communication with the second UE,
    wherein the second control signal indicates that the master BS of the first UE is added as a new member BS for the second communication.

11. The master BS of claim 10, wherein the least one processor is further configured to determine whether to release a connection established with the member BS.

12. The master BS of claim 11, wherein the least one processor is further configured to determine the releasing of the connection while performing the second communication.

13. The master BS of claim 10, wherein the second control signal indicates releasing of a connection established with the master BS of the second UE, and
    wherein, while performing the first communication, the releasing of the connection established with the master BS of the second UE is determined by the master BS of the second UE.

14. A member base station (BS) for communicating in a wireless communication system, the member BS comprising:
- a transceiver configured to receive, from a master BS performing a first communication with a first user equipment (UE), a first control signal for the first communication with the first UE; and
- at least one processor configured to:
  - perform the first communication with the first UE based on the first control signal, and
  - while performing the first communication, control the transceiver to transmit, to a member BS of a second UE, a second control signal for a second communication with the second UE,
  - wherein the second control signal indicates that the master BS of the first UE is added as a new member BS for the second UE.

15. The member BS of claim 14, wherein, while performing the first communication, the least one processor is further configured to determine whether to release a connection established with the member BS of the second UE.

16. The member BS of claim 14, wherein the least one processor is further configured to:
- determine whether at least one additional member BS is able to perform the second communication based on measurements reported from the second UE, and
- if the at least one additional member BS is able to perform the second communication, control the transceiver to transmit, to the second UE, information related to the at least one additional member BS.

17. A first user equipment (UE) for communicating in a wireless communication system, the first UE comprising:
- at least one processor configured to perform a first communication with at least one of a master base station (BS) and a member base station (BS); and
- a transceiver configured to:
  - report, to the master BS, measurements for the first communication,
  - receive, from the master BS, information related to at least one additional member BS to perform the first communication determined based on the measurements, and
  - establish a connection with the at least one additional member BS,
- wherein the information related to at least one additional member BS is received from the master BS to receive a second control signal for a second communication with a master BS of a second UE while performing the first communication,
- wherein the second control signal indicates that the master BS of the first UE is added as a new member BS for the second communication.

18. The first UE of claim 17, wherein releasing of a connection established with the member BS is determined by the master BS of the first UE to perform the second communication with the master BS of the second UE.

* * * * *